(12) United States Patent
Park et al.

(10) Patent No.: US 10,771,105 B2
(45) Date of Patent: Sep. 8, 2020

(54) CONFIGURATION OF NOMA COMMUNICATION USING MULTIPLE SETS OF SPREADING SEQUENCES

(71) Applicant: QUALCOMM Incorporated, San Diego, CA (US)

(72) Inventors: Seyong Park, San Diego, CA (US); Peter Gaal, San Diego, CA (US); Wanshi Chen, San Diego, CA (US); Jing Lei, San Diego, CA (US); Jay Kumar Sundararajan, San Diego, CA (US); Renqiu Wang, San Diego, CA (US); Joseph Binamira Soriaga, San Diego, CA (US); Naga Bhushan, San Diego, CA (US); Tingfang Ji, San Diego, CA (US); John Edward Smee, San Diego, CA (US)

(73) Assignee: QUALCOMM Incorporated, San Deigo, CA (US)

( * ) Notice: Subject to any disclaimer, the term of this patent is extended or adjusted under 35 U.S.C. 154(b) by 0 days.

(21) Appl. No.: 16/280,879

(22) Filed: Feb. 20, 2019

(65) Prior Publication Data
US 2019/0260418 A1 Aug. 22, 2019

Related U.S. Application Data

(60) Provisional application No. 62/634,110, filed on Feb. 22, 2018.

(51) Int. Cl.
*H04B 1/709* (2011.01)
*H04B 1/7093* (2011.01)
(Continued)

(52) U.S. Cl.
CPC .......... *H04B 1/7093* (2013.01); *G06F 17/14* (2013.01); *H04J 13/0003* (2013.01);
(Continued)

(58) Field of Classification Search
CPC ................... H04B 1/7093; H04B 2001/70935
(Continued)

(56) References Cited

U.S. PATENT DOCUMENTS

| 6,385,187 B1 * | 5/2002 | Ahn ........................ H04B 1/707 370/342 |
| 6,577,671 B1 * | 6/2003 | Vimpari .............. H04J 13/0048 375/140 |

(Continued)

FOREIGN PATENT DOCUMENTS

WO       2018030685 A1     2/2018

OTHER PUBLICATIONS

International Search Report and Written Opinion—PCT/US2019/018951—ISA/EPO—May 17, 2019.

*Primary Examiner* — Kevin M Burd
(74) *Attorney, Agent, or Firm* — Harrity & Harrity, LLP

(57) ABSTRACT

Various aspects of the present disclosure generally relate to wireless communication. In some aspects, a network controller may determine a first set of spreading sequences and a second set of spreading sequences for non-orthogonal multiple access (NOMA) communication, wherein the first set of spreading sequences is different than the second set of spreading sequences; and configure a first cell to use the first set of spreading sequences and a second cell to use the second set of spreading sequences; or configure the first set of spreading sequences to be used for first user equipment associated with a cell center of the first cell and the second set of spreading sequences to be used for second user equipment associated with a cell edge of the first cell or the second cell. Numerous other aspects are provided.

30 Claims, 14 Drawing Sheets

(51) Int. Cl.
*H04J 13/00* (2011.01)
*G06F 17/14* (2006.01)
*H04W 72/04* (2009.01)
*H04J 13/16* (2011.01)
*H04B 1/69* (2011.01)
*H04J 11/00* (2006.01)

(52) U.S. Cl.
CPC .......... *H04J 13/0062* (2013.01); *H04J 13/16* (2013.01); *H04W 72/048* (2013.01); *H04W 72/0446* (2013.01); *H04B 2001/6904* (2013.01); *H04B 2001/70935* (2013.01); *H04J 11/0073* (2013.01); *H04J 11/0076* (2013.01)

(58) Field of Classification Search
USPC ........................................................ 375/130
See application file for complete search history.

(56) References Cited

U.S. PATENT DOCUMENTS

| | | | |
|---|---|---|---|
| 7,301,983 B1* | 11/2007 | Horne | H04B 1/707 375/130 |
| 2015/0171983 A1* | 6/2015 | Kusashima | H04J 11/004 370/329 |
| 2016/0345310 A1* | 11/2016 | Hunukumbure | H04W 72/1231 |
| 2017/0033963 A1* | 2/2017 | Li | H04L 27/2615 |
| 2017/0288834 A1 | 10/2017 | Yuan et al. | |
| 2018/0184390 A1* | 6/2018 | Wu | H04W 4/70 |

\* cited by examiner

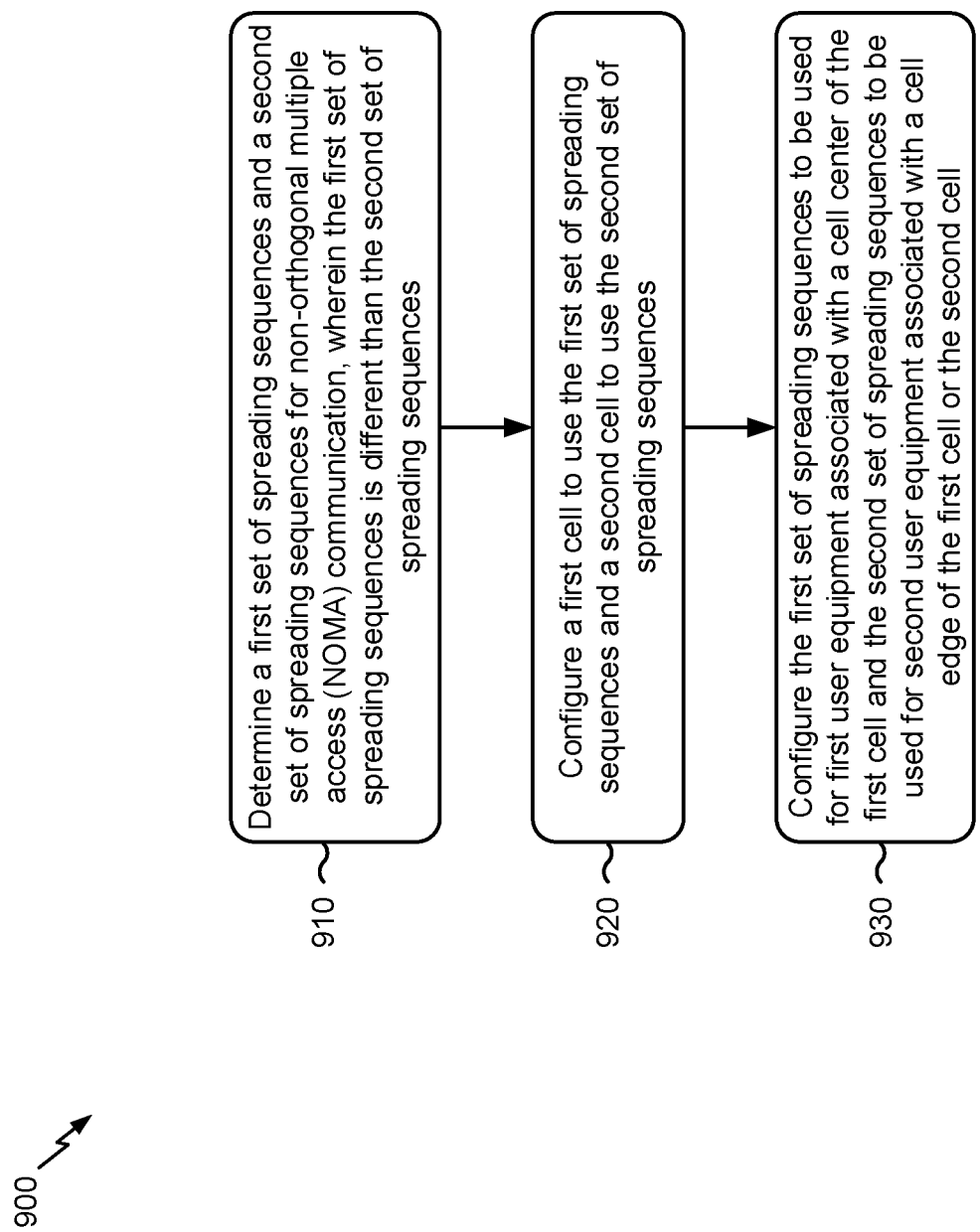

CONFIGURATION OF NOMA COMMUNICATION USING MULTIPLE SETS OF SPREADING SEQUENCES

CROSS-REFERENCE TO RELATED APPLICATIONS UNDER 35 U.S.C. § 119

This application claims priority to U.S. Provisional Patent Application No. 62/634,110, filed on Feb. 22, 2018, entitled "TECHNIQUES AND APPARATUSES FOR CONFIGURATION OF NOMA COMMUNICATION USING MULTIPLE SETS OF SPREADING SEQUENCES," which is hereby expressly incorporated by reference herein.

FIELD OF THE DISCLOSURE

Aspects of the present disclosure generally relate to wireless communication, and more particularly to techniques and apparatuses for configuration of non-orthogonal multiple access (NOMA) communication using multiple sets of spreading sequences.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a network controller, may include determining a first set of spreading sequences and a second set of spreading sequences for non-orthogonal multiple access (NOMA) communication, wherein the first set of spreading sequences is different than the second set of spreading sequences; and configuring a first cell to use the first set of spreading sequences and a second cell to use the second set of spreading sequences; or configuring the first set of spreading sequences to be used for first user equipment associated with a cell center of the first cell and the second set of spreading sequences to be used for second user equipment associated with a cell edge of the first cell or the second cell.

In some aspects, a network controller for wireless communication may include memory and one or more processors operatively coupled to the memory. The memory and the one or more processors may be configured to determine a first set of spreading sequences and a second set of spreading sequences for NOMA communication, wherein the first set of spreading sequences is different than the second set of spreading sequences; and configure a first cell to use the first set of spreading sequences and a second cell to use the second set of spreading sequences; or configure the first set of spreading sequences to be used for first user equipment associated with a cell center of the first cell and the second set of spreading sequences to be used for second user equipment associated with a cell edge of the first cell or the second cell.

In some aspects, a non-transitory computer-readable medium may store one or more instructions for wireless communication. The one or more instructions, when executed by one or more processors of a network controller, may cause the one or more processors to determine a first set of spreading sequences and a second set of spreading sequences for NOMA communication, wherein the first set of spreading sequences is different than the second set of spreading sequences; and configure a first cell to use the first set of spreading sequences and a second cell to use the second set of spreading sequences; or configure the first set of spreading sequences to be used for first user equipment associated with a cell center of the first cell and the second set of spreading sequences to be used for second user equipment associated with a cell edge of the first cell or the second cell.

In some aspects, an apparatus for wireless communication may include means for determining a first set of spreading sequences and a second set of spreading sequences for NOMA communication, wherein the first set of spreading sequences is different than the second set of spreading sequences; and means for configuring a first cell to use the first set of spreading sequences and a second cell to use the second set of spreading sequences; or means for configuring the first set of spreading sequences to be used for first user equipment associated with a cell center of the first cell and the second set of spreading sequences to be used for second user equipment associated with a cell edge of the first cell or the second cell.

Aspects generally include a method, apparatus, system, computer program product, non-transitory computer-readable medium, user equipment, base station, network controller, network device, access and mobility management function, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a network controller, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
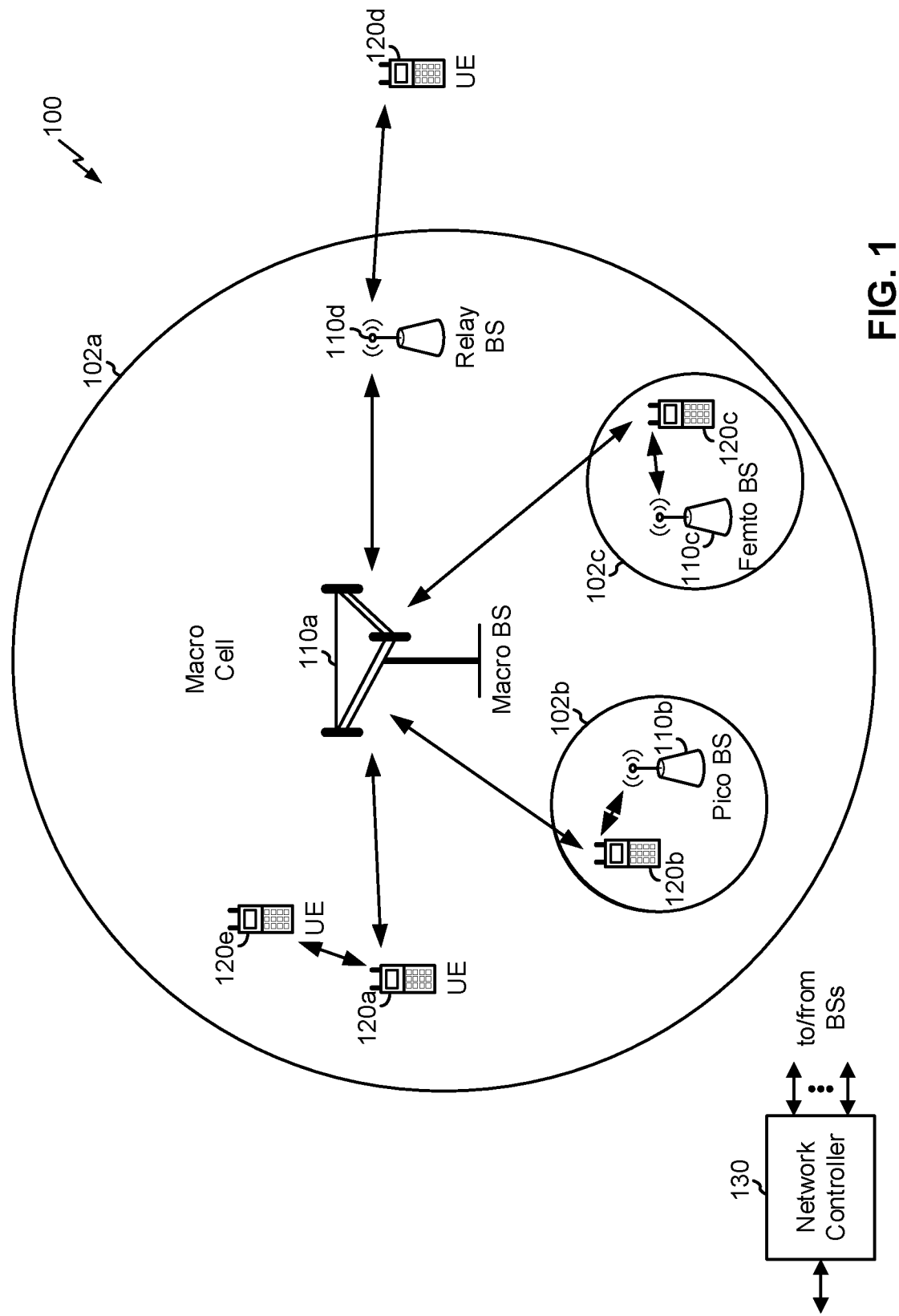
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (e.g., smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
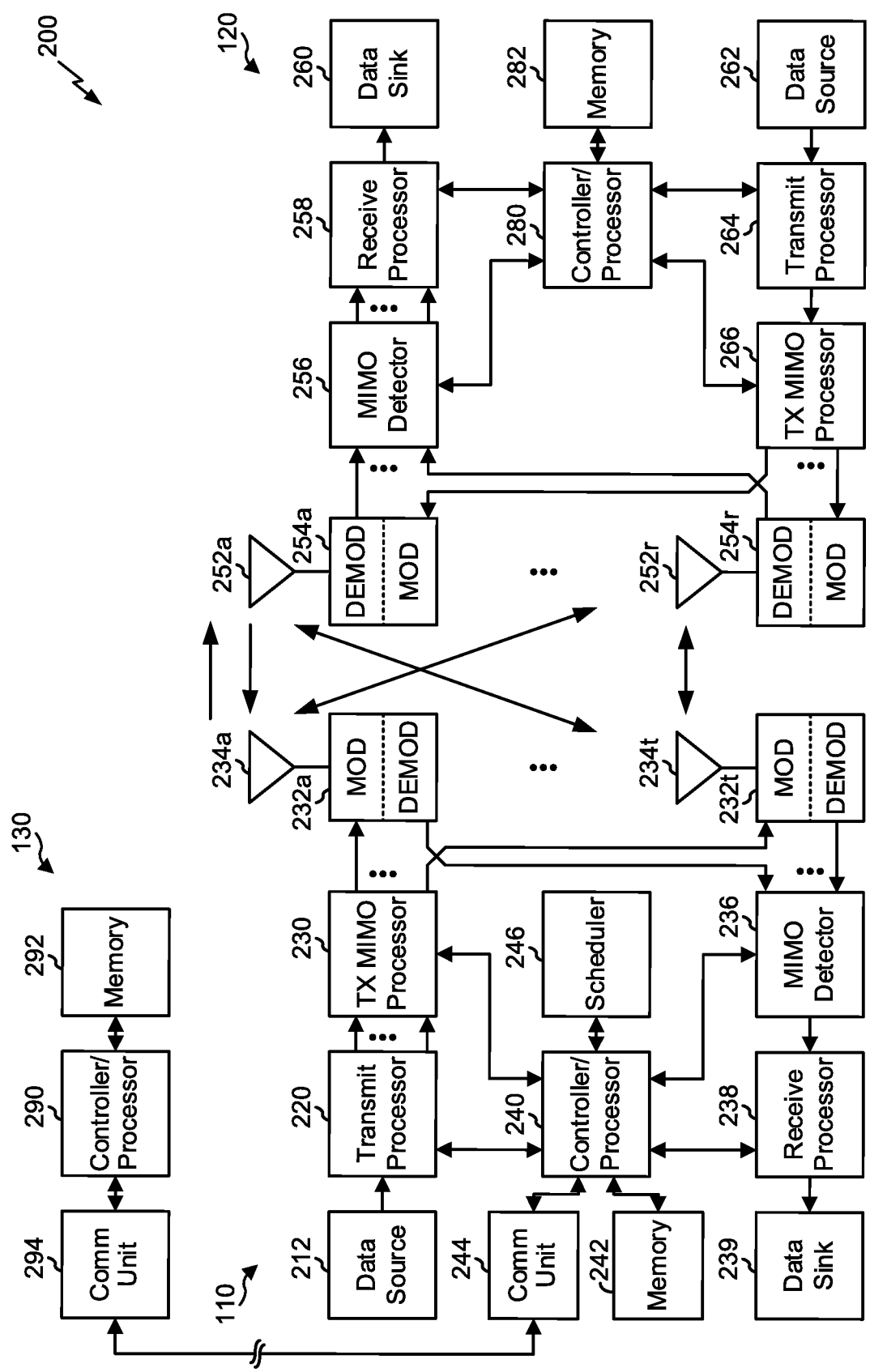
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292. In some aspects, one or more components of UE 120 may be included in a housing.

Controller/processor 240 of BS 110, controller/processor 280 of UE 120, controller/processor 290 of network controller 130, and/or any other component(s) of FIG. 2 may perform one or more techniques associated with symbol processing, as described in more detail elsewhere herein. For example, controller/processor 240 of BS 110, controller/processor 280 of UE 120, controller/processor 290 of network controller 130, and/or any other component(s) of FIG. 2 may perform or direct operations of, for example, process 900 of FIG. 9 and/or other processes as described herein. Memories 242 and 282 may store data and program codes for BS 110 and UE 120, respectively. A scheduler 246 may schedule UEs for data transmission on the downlink and/or uplink.

In some aspects, network controller 130 or BS 110 may include means for determining a first set of spreading sequences and a second set of spreading sequences for NOMA communication, wherein the first set of spreading sequences is different than the second set of spreading sequences; means for configuring a first cell to use the first set of spreading sequences and a second cell to use the second set of spreading sequences; means for configuring the first set of spreading sequences to be used for first user equipment associated with a cell center of the first cell and the second set of spreading sequences to be used for second user equipment associated with a cell edge of the first cell or the second cell; and/or the like. In some aspects, such means may include one or more components of network controller 130 or BS 110 described in connection with FIG. 2.

As indicated above, FIG. 2 is provided merely as an example. Other examples may differ from what is described with regard to FIG. 2.

Figure 3A:
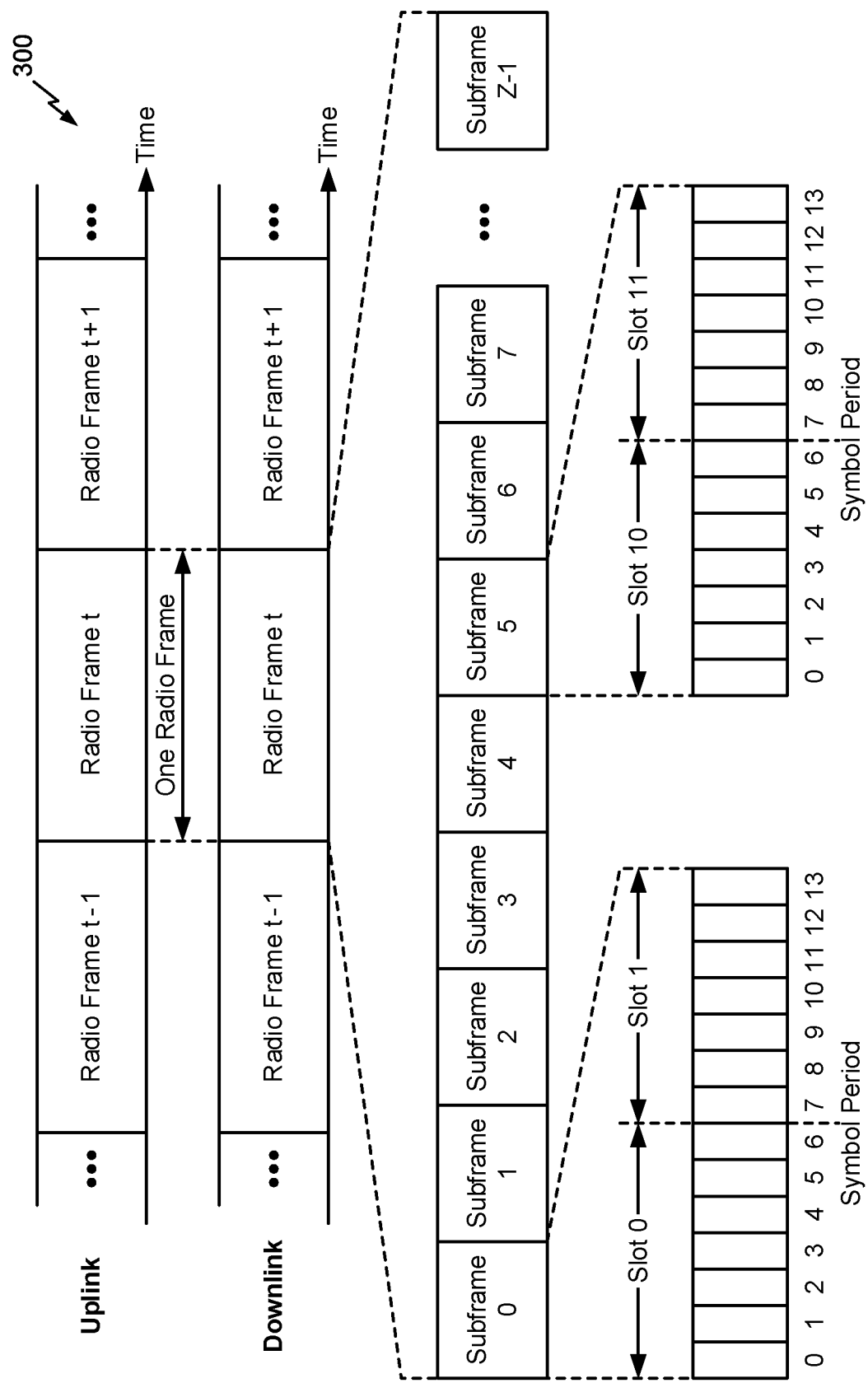
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
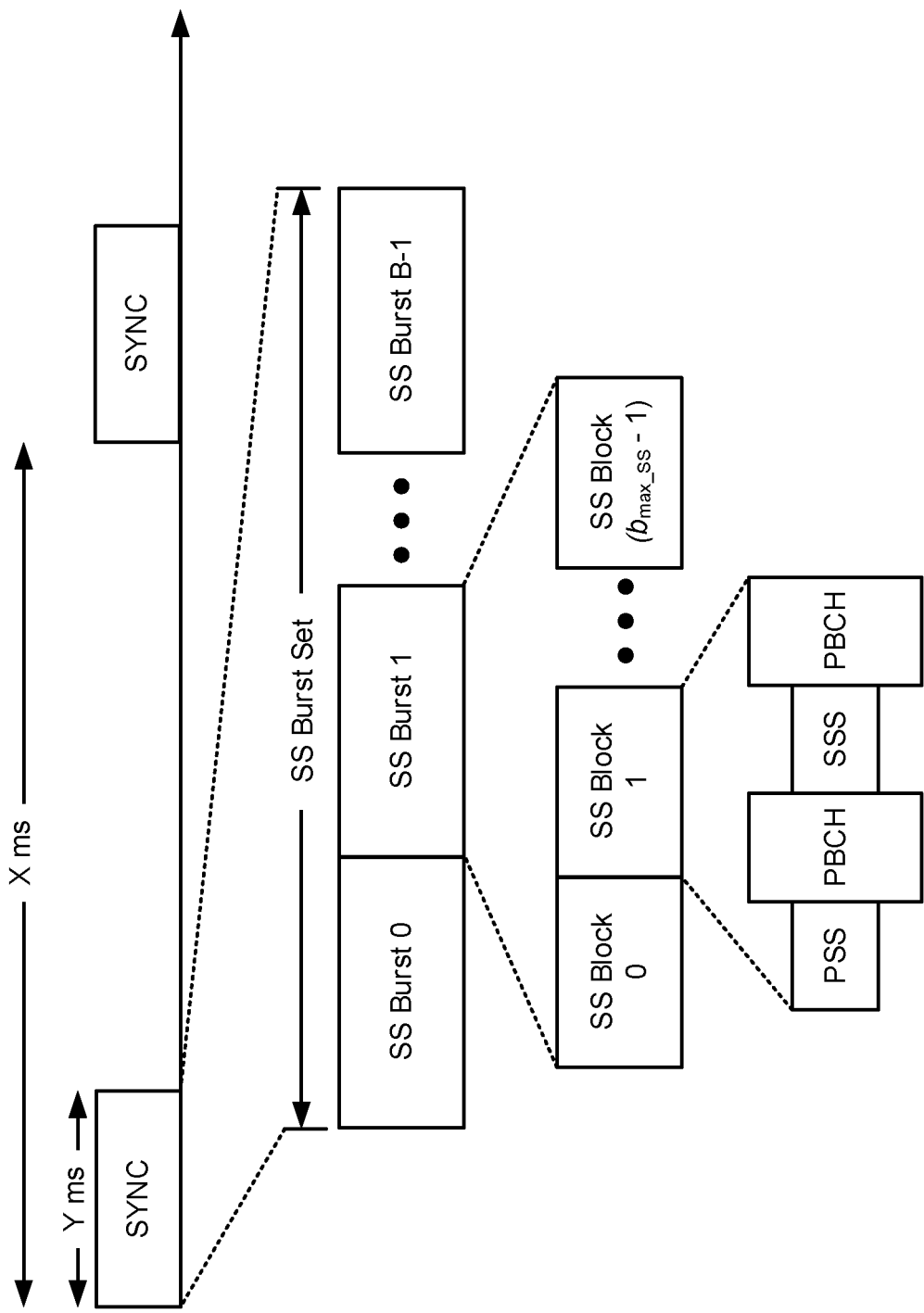
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as one or more examples. Other examples may differ from what is described with regard to FIGS. 3A and 3B.

Figure 4:
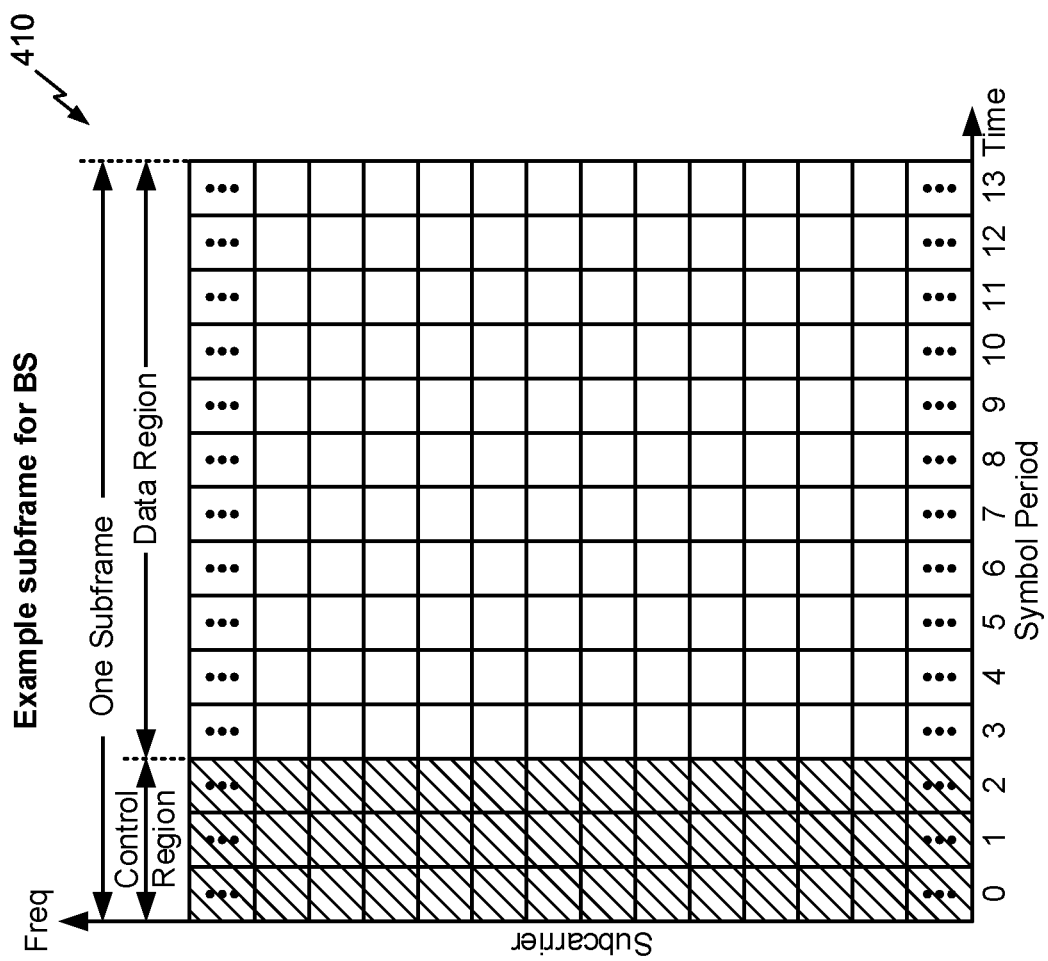
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
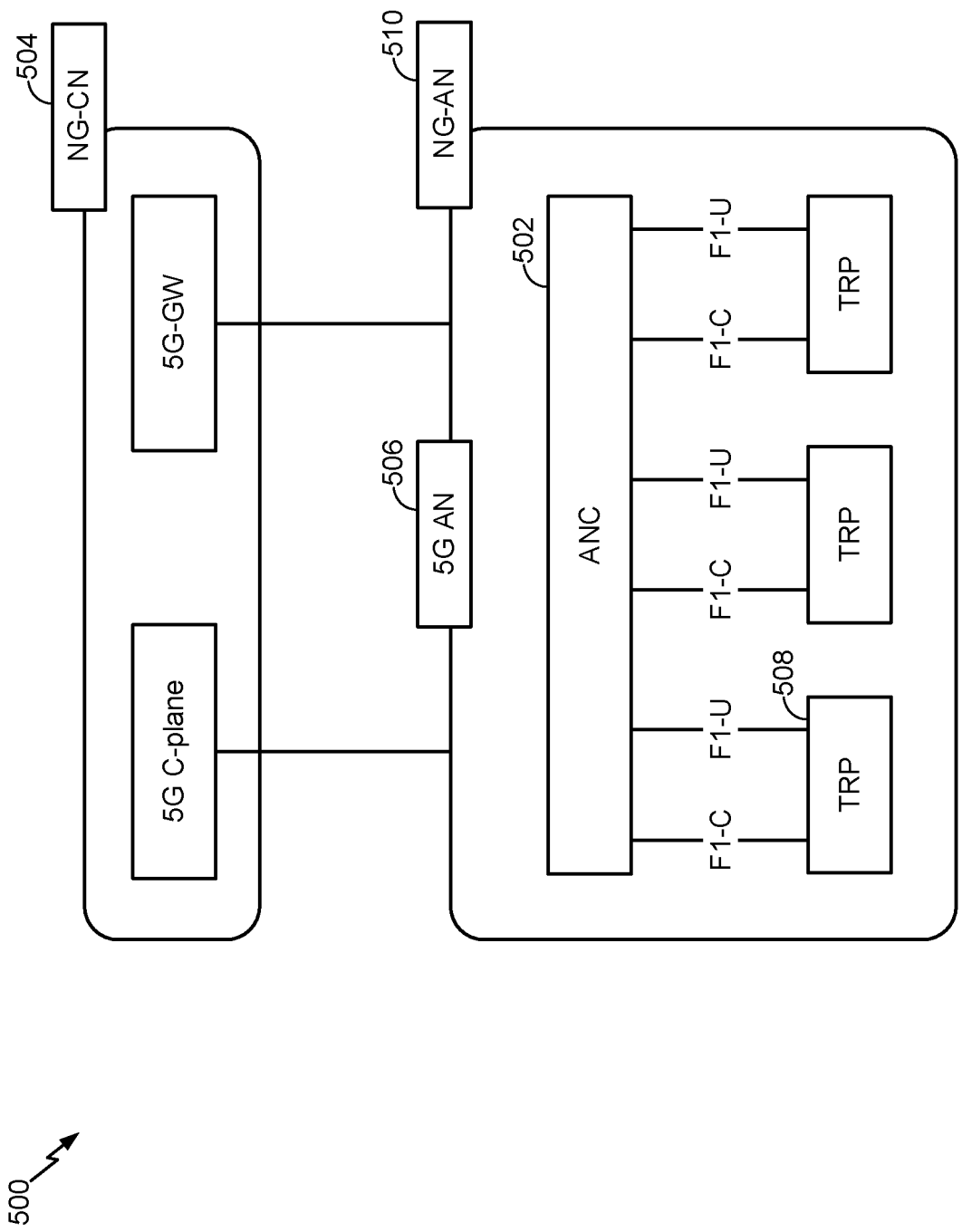
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
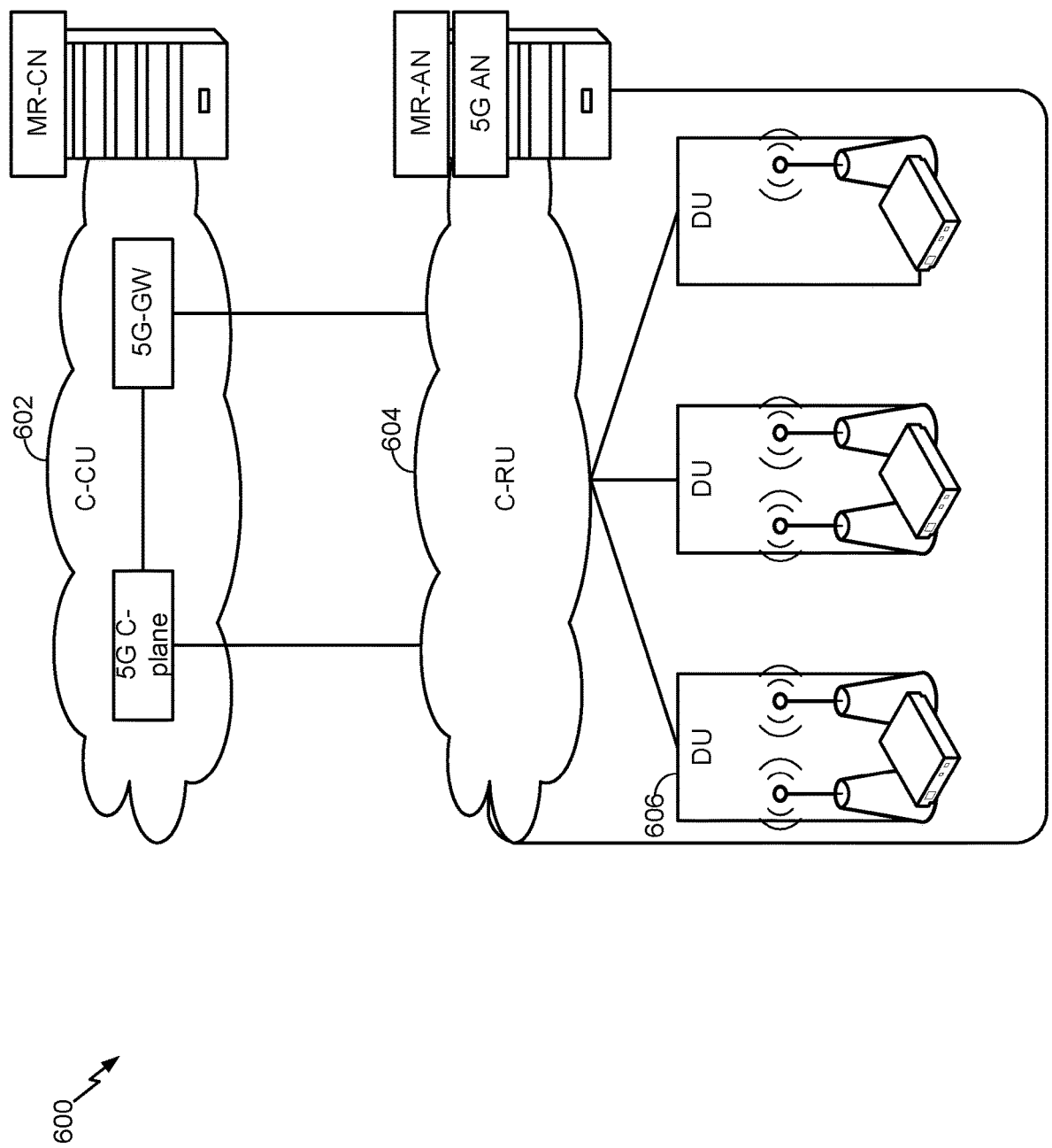
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples differ from what is described with regard to FIG. 6.

A UE may modulate and process data for transmission of the data. For example, the UE may segment data into transport blocks for transport, encode the data, scramble the data, modulate the data, and/or the like. In resource spread multiple access (RSMA) using non-orthogonal multiple access (NOMA) based communication, the UE may apply a relatively low-rate channel coding scheme (e.g., less than a threshold rate, such as binary phase shift keying (BPSK), quadrature phase shift keying (QPSK), and/or the like) and may apply UE specific scrambling to data. In this way, a network may enable grant-free transmission, asynchronous multiple access, and/or the like. Moreover, use of RSMA using NOMA may enable a plurality of UEs to share a common set of network resources.

In a NOMA-based processing scheme, the UE may apply spreading to a set of symbols after modulating a set of symbols (e.g., to transform each symbol into a particular quantity of chips based at least in part on a spreading factor), and may scramble the set of symbols (e.g., may scramble the set of chips to enable demodulation of the set of chips by a BS). The UE may apply the spreading and the scrambling based at least in part on short spreading code codebook sequences and long scrambling sequences, respectively. A short code sequence may be UE-specific and a long sequence may be BS-specific (e.g., for each group of UEs using a particular BS).

It may be beneficial to reduce inter-cell interference between BSs and UEs performing NOMA communications in order to improve throughput, enable more complex modulation schemes, and/or the like. One technique for reducing inter-cell interference may be to use cell-specific long scrambling sequences, as described above. This may provide near-random sequences for different cells, thereby reducing inter-cell interference in comparison to using scrambling sequences that are not cell-specific. However, further inter-cell interference reduction can be achieved, even beyond what is likely to be achieved when using cell-specific long scrambling sequences.

Some techniques and apparatuses described herein provide for assignment of sets of short spreading sequences to UEs of different cells and/or UEs located in different parts of a cell. For example, a first set of spreading sequences may be assigned to UEs of a first cell and a second set of spreading sequences may be assigned to UEs of a second sell. As another example, a first set of spreading sequences may be assigned to UEs at a cell center, and a second set of spreading sequences may be assigned to UEs at a cell edge. The different sets of spreading sequences may be configured to reduce inter-cell interference between the first cell and the second cell based at least in part on configuration of one or more codebooks associated with the different sets of spreading sequences. In this way, inter-cell interference between the first cell and the second cell, and inter-cell interference associated with the UEs at the cell edge, may be reduced. Thus, radio performance of NOMA communications may be improved by reducing inter-cell interference between cells performing NOMA communications.

Figure 7:
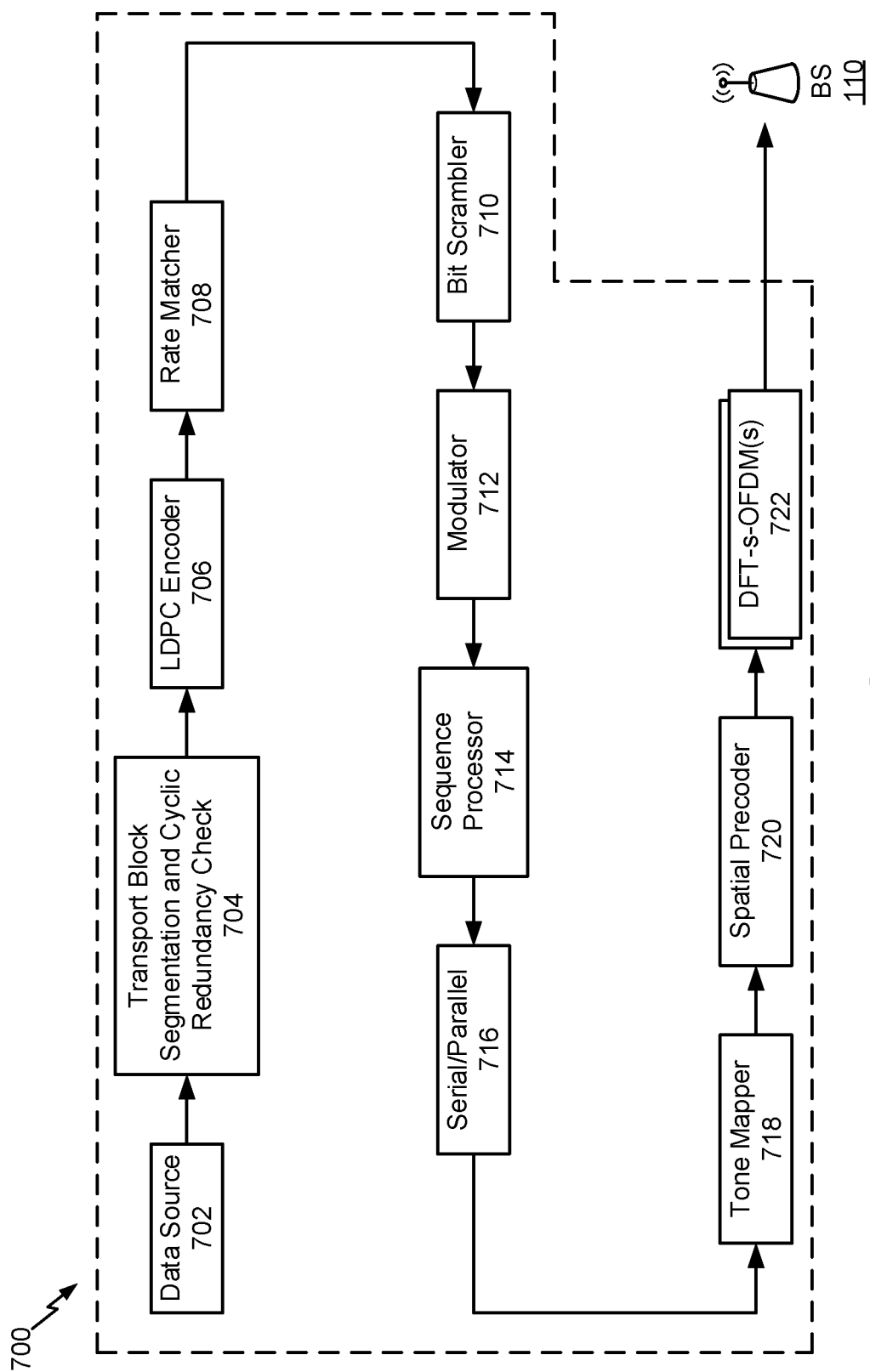
FIG. 7 is a diagram illustrating an example of symbol processing, in accordance with various aspects of the present disclosure.

FIG. 7 is a diagram illustrating an example 700 of symbol processing, in accordance with various aspects of the present disclosure. As shown in FIG. 7, example 700 may include a BS 110 and a UE 120.

As further shown in FIG. 7, UE 120 may include a plurality of components for RSMA using NOMA based symbol processing. For example, UE 120 includes a data source component 702 to provide data; a transport block segmentation and cyclic redundancy check component 704 to perform transport block segmentation and a cyclic redundancy check; a low density parity check (LDPC) encoder component 706 to perform LDPC encoding; a rate matcher component 708 to perform rate matching; a bit scrambler component 710 to perform bit scrambling; a modulator component 712 to perform symbol modulation; a sequence processor component 714 to process symbols using a set of sequences; a serial/parallel component 716 to perform serial-to-parallel conversion; a tone mapper component 718 to perform tone mapping; a spatial precoder component 720 to perform precoding; a set of DFT-s-OFDM component(s) 722 to multiplex a waveform; and/or the like.

Sequence processor component 714 may perform spreading (e.g., using a short spreading sequence) and/or scrambling (e.g., using a long scrambling sequence) of the symbols. For example, a set of short spreading sequences may be associated with a spreading factor and a number of UEs. The spreading factor may identify a number of times that a data symbol is repeated and spread according to the short spreading sequence, and the number of UEs may identify a number of UEs that are to use the set of short spreading sequences. For example, a set of spreading sequences for 6 UEs, with a spreading factor of 4, may cause each of the 6 UEs to repeat a data symbol 4 times, applying a different codeword for each repetition.

In some aspects, as described below in connection with FIGS. 8A-8C, a set of spreading sequences for N UEs using a spreading factor of K may be described using the notation [S1, S2, . . . SN], and each of S1, S2, . . . SN may include K codewords for repetition and spreading of symbols by the corresponding UE. In some aspects, [S1, S2, . . . SN] may be identified by a codebook that may be configured to reduce intra-cell or inter-cell interference for the UEs associated with [S1, S2, . . . SN].

In some aspects, as described below in connection with FIGS. 8D and 8E, a set of spreading sequences may refer to a subset of spreading sequences of a codebook. For example, as described below in connection with FIGS. 8D and 8E, one set of spreading sequences is used for cell-center UEs and another set of spreading sequences is used for cell-edge UEs. In these cases, the sets of spreading sequences are of a single codebook, which may reduce inter-cell interference associated with the cell-edge UEs and simplify determination of the single codebook (in comparison to determining multiple, different codebooks corresponding to different sets of spreading sequences, as described below in connection with FIGS. 8A-8C).

As indicated above, FIG. 7 is provided as an example. Other examples may differ from what is described with respect to FIG. 7.

FIGS. 8A-8E are diagrams illustrating examples 800 of configuration of NOMA communication using multiple sets of spreading sequences to reduce inter-cell interference, in accordance with various aspects described herein. As shown, examples 800 include a first BS 110-1 and a second BS 110-2, which are associated with a first cell 802 and a second cell 804, respectively. In some aspects, first cell 802 and second cell 804 may be provided by a single BS 110.

Figure 8A:
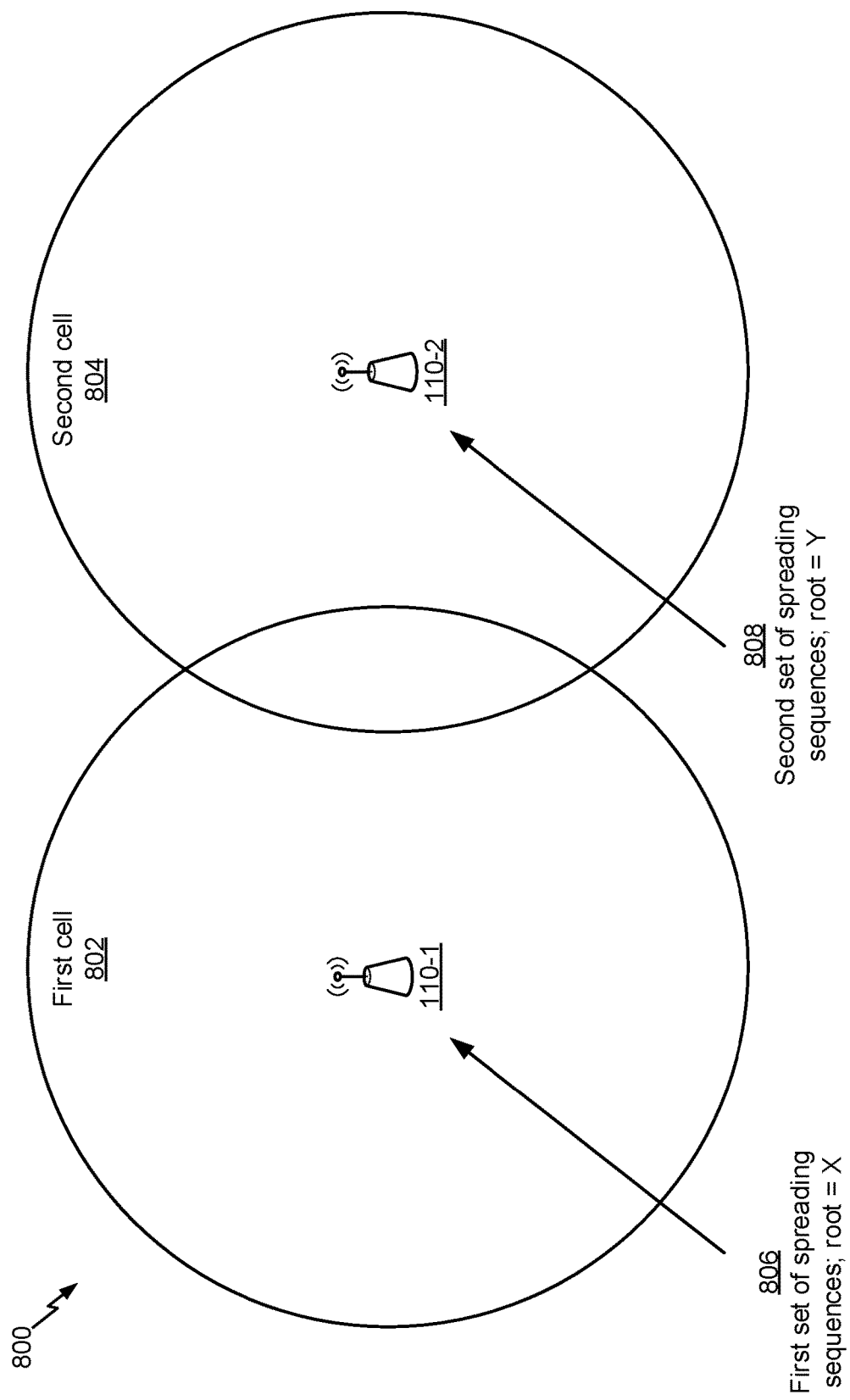
FIGS. 8A-8E are diagrams illustrating examples of configuration of NOMA communication using multiple sets of spreading sequences to reduce inter-cell interference, in accordance with various aspects described herein.
Figure 8B:
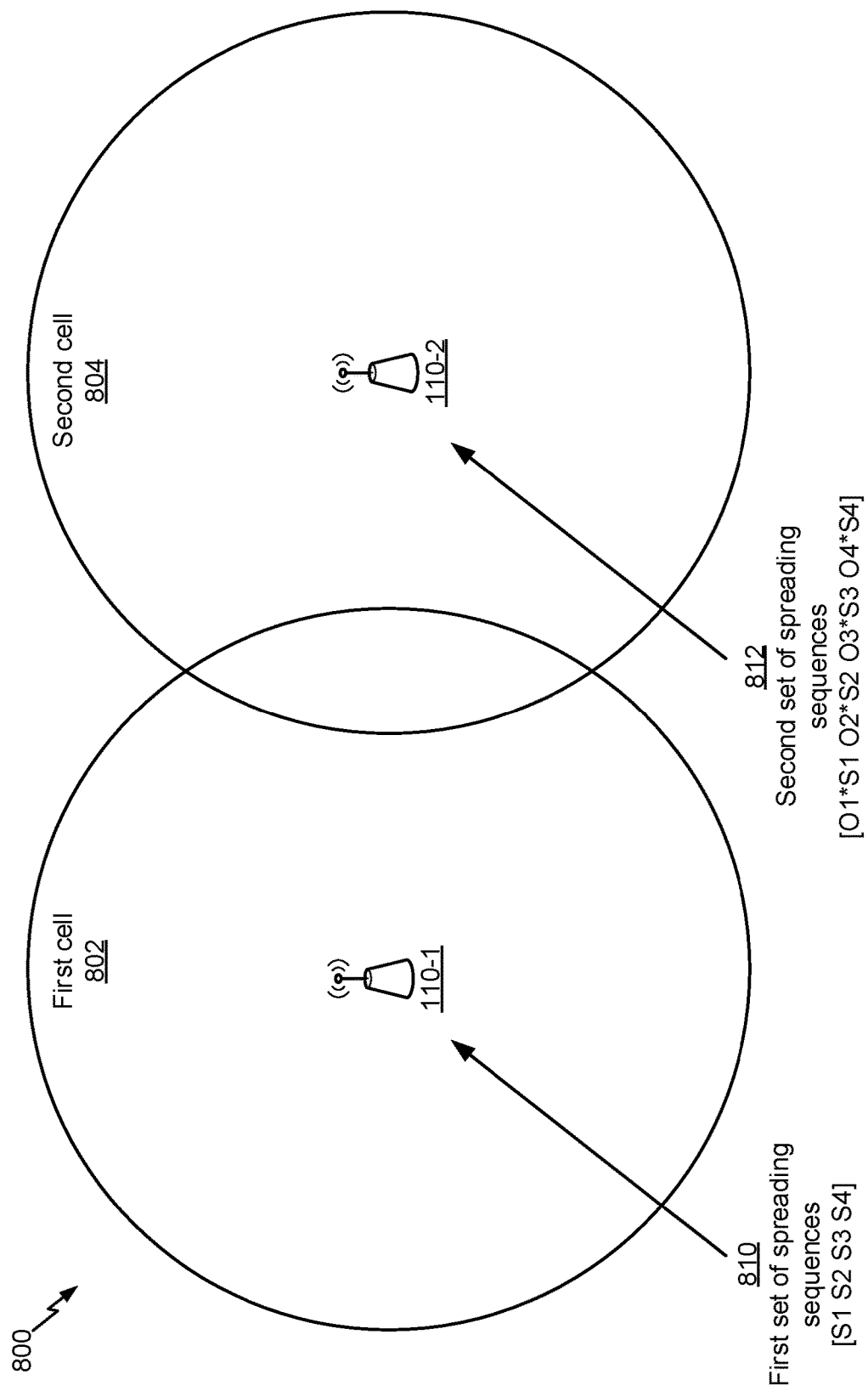
Figure 8C:
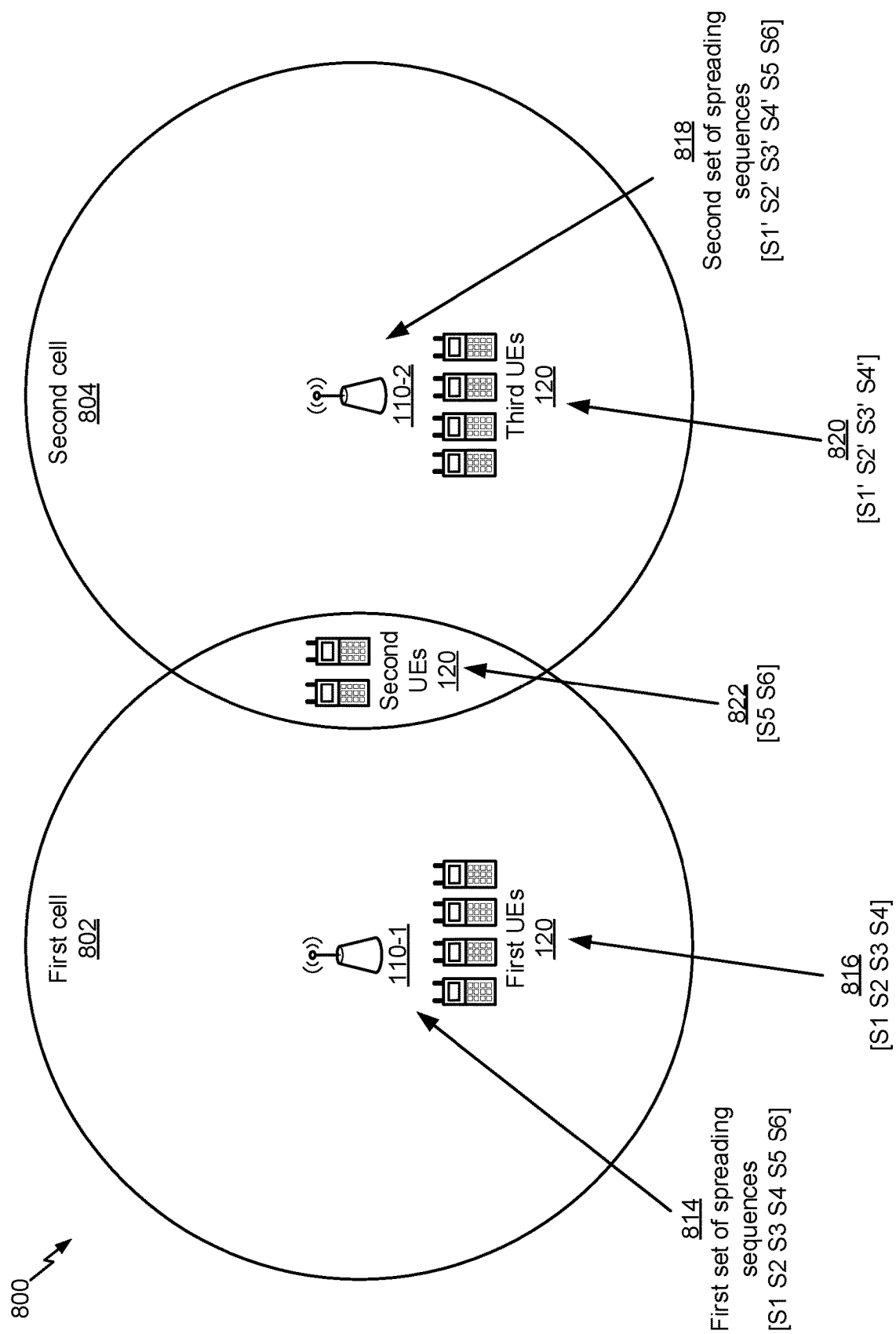
Figure 8D:
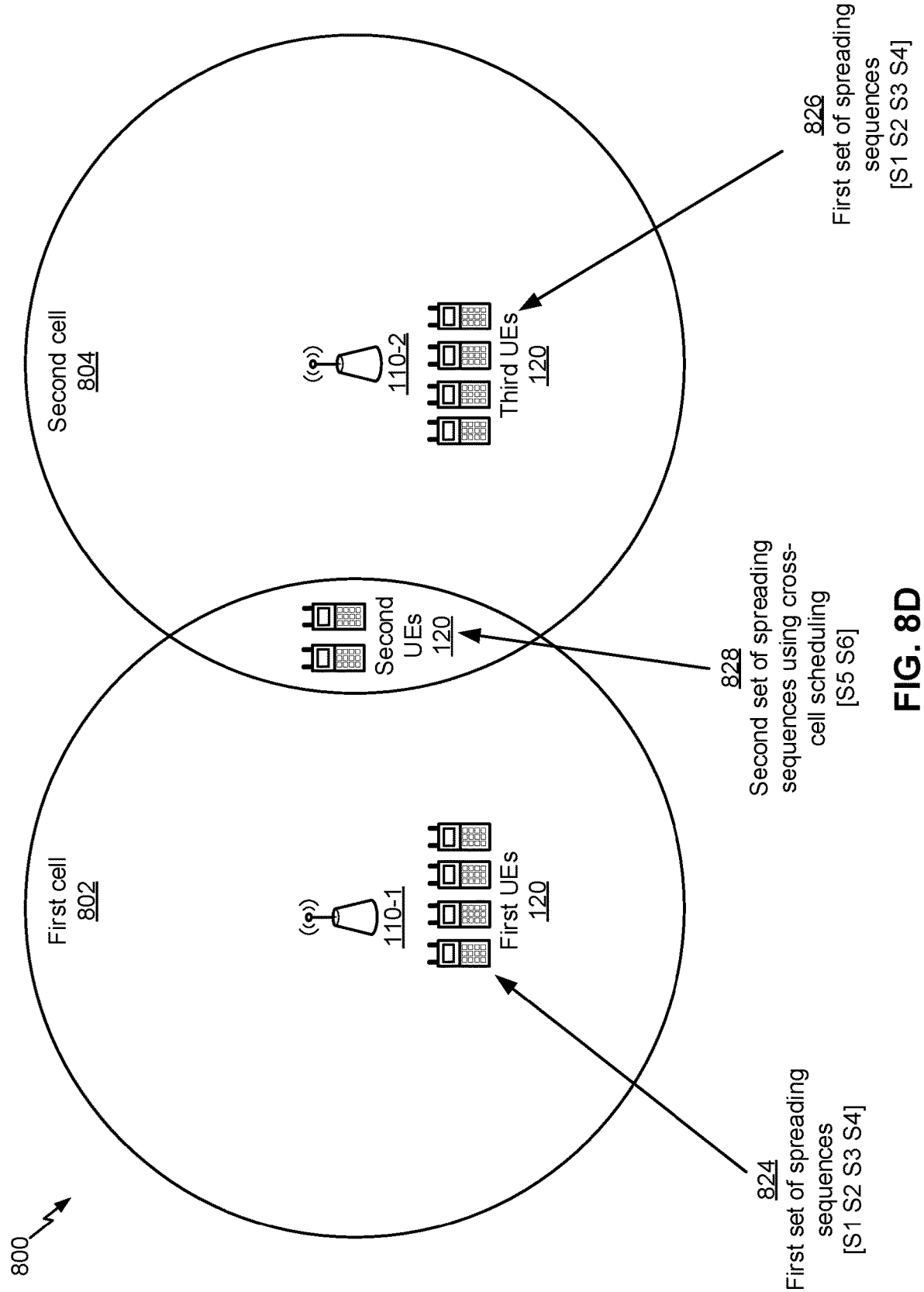
Figure 8E:
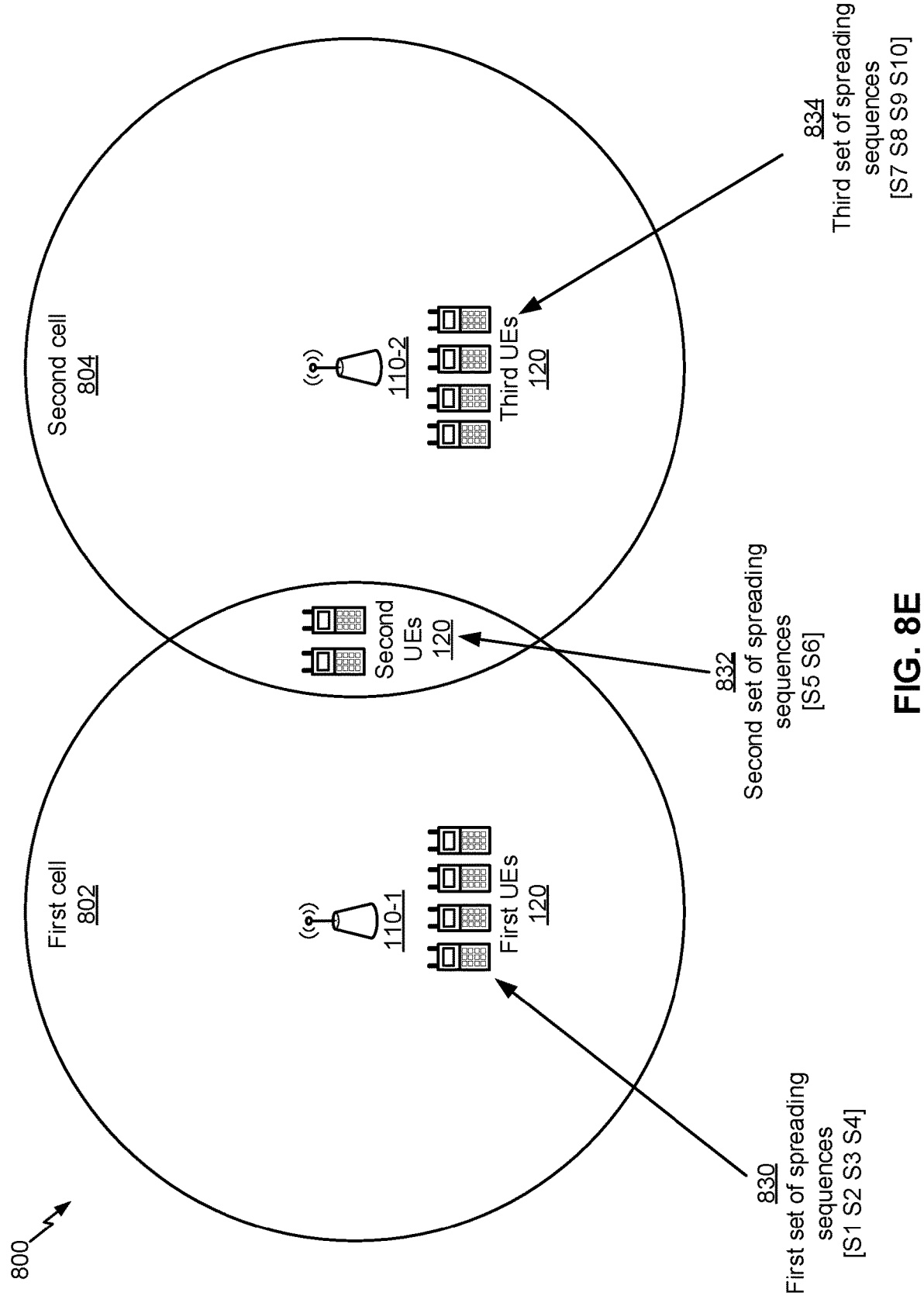

As further shown, FIGS. 8C-8E include first UEs 120 (e.g., one or more UEs) located at a cell center of the first cell 802. For example, the first UEs 120 may be within a threshold distance of BS 110-1, may be associated with a threshold signal strength or signal quality with regard to the first cell 802, may be a threshold distance from BS 110-2, and/or the like.

As further shown, FIGS. 8C-8E include second UEs 120 (e.g., one or more UEs) located at a cell edge of the first cell 802 and the second cell 804. Here, the second UEs 120 are located in an overlapping area of the first cell 802 and the second cell 804. In some aspects, a second UE 120 may be located at a cell edge of a single cell. In other words, a second UE 120 may refer to any UE located at a cell edge of a cell, and/or may include any UE located in an overlap of two cells. The second UEs 120 may be scheduled by, configured by, connected to, associated with an active connection with, camped on, and/or associated with the first cell 802 and/or the second cell 804. In some aspects, the second UEs 120 may be a threshold distance from BS 110-1 or BS 110-2, may be associated with a threshold signal strength or signal quality with regard to the first cell 802 and/or the second cell 804, and/or the like.

As further shown, FIGS. 8C-8E include third UEs 120 (e.g., one or more UEs) located at a cell center of the second cell 804. For example, the third UEs 120 may be within a threshold distance of BS 110-2, may be associated with a threshold signal strength or signal quality with regard to the second cell 804, may be a threshold distance from BS 110-1, may be UEs 120 that are determined not to be cell-edge UEs 120, and/or the like.

FIG. 8A illustrates an example wherein different sets of spreading sequences, associated with different codebooks that are generated using different roots, are used for the first cell 802 and the second cell 804. As shown by reference number 806, the first cell 802 (e.g., the BS 110-1) may use a first set of spreading sequences generated using a first root (e.g., X, which may be any value). As shown by reference number 808, the second cell 804 may use a second set of spreading sequences generated using a second root (e.g., Y, which may be any value). For example, the second root may be different than the first root.

In some aspects, the first set of spreading sequences and the second set of spreading sequences may be generated using a Chu sequence, such as a truncated Chu sequence. A Chu sequence may refer to a Zadoff-Chu sequence. As one example, for a set of 6 UEs 120 of the first cell 802 and 6 UEs 120 of the second cell 804 (e.g., wherein the number of UEs, N, is equal to 6 for each cell), and for a spreading factor of 4, the first set of spreading sequences may be A and the second set of spreading sequences may be B, wherein:

A=[exp(−j*pi*[0:3].*[1:4]/6*1);
    exp(−j*pi*[1:4].*[2:5]/6*1);
    exp(−j*pi*[2:5].*[3:6]/6*1);
    exp(−j*pi*[3:6].*[4:7]/6*1);
    exp(−j*pi*[4:7].*[5:8]/6*1);
    exp(−j*pi*[5:8].*[6:9]/6*1)], and
B=[exp(−j*pi*[0:3].*[1:4]/6*5);
    exp(−j*pi*[1:4].*[2:5]/6*5);
    exp(−j*pi*[2:5].*[3:6]/6*5);
    exp(−j*pi*[3:6].*[4:7]/6*5);
    exp(−j*pi*[4:7].*[5:8]/6*5);

exp(−j*pi*[5:8].*[6:9]/6*5)].

In the above spreading sequences, A uses a root (e.g., the last value of each spreading sequence) of 1 and B uses a root of 5. Here, each of the 6 UEs 120 of the first cell 802 may perform spreading according to one of the spreading sequences of A and each of the 6 UEs 120 of the second cell 804 may perform spreading according to one of the spreading sequences of B.

The example set of spreading sequences described above (e.g., A and B) can be generalized as a truncated Chu sequence for a number of UEs N and a spreading factor K as:

$$\left[\exp\left(-j*\pi*0*1*\frac{1}{N}*0\right), \exp\left(-j*\pi*1*2*\frac{1}{N}*0\right), \ldots, \right.$$
$$\left. \exp\left(-j*\pi*(K-1)*K*\frac{1}{N}*0\right)\right]$$
$$\left[\exp\left(-j*\pi*0*1*\frac{1}{N}*1\right), \exp\left(-j*\pi*1*2*\frac{1}{N}*1\right), \ldots, \right.$$
$$\left. \exp\left(-j*\pi*(K-1)*K*\frac{1}{N}*1\right)\right]$$
$$\left[\exp\left(-j*\pi*0*1*\frac{1}{N}*2\right), \exp\left(-j*\pi*1*2*\frac{1}{N}*2\right), \ldots, \right.$$
$$\left. \exp\left(-j*\pi*(K-1)*K*\frac{1}{N}*2\right)\right] \ldots \left[\exp\left(-j*\pi*0*1*\frac{1}{N}*(N-1)\right), \right.$$
$$\exp\left(-j*\pi*1*2*\frac{1}{N}*(N-1)\right), \ldots,$$
$$\left. \exp\left(-j*\pi*(K-1)*K*\frac{1}{N}*(N-1)\right)\right].$$

FIG. 8B illustrates an example wherein a mask sequence is applied to a first set of spreading sequences to generate a second set of spreading sequences. As shown in FIG. 8B, and by reference number 810, a first set of spreading sequences may be used for the first cell 802 (e.g., [S1 S2 S3 S4]). As shown by reference number 812, a second set of spreading sequences may be used for the second cell 804. For example, the second set of spreading sequences may be generated based at least in part on the first set of spreading sequences and using a mask sequence (e.g., [O1 O2 O3 O4]). Here, the second set of spreading sequences is shown as [O1*S1 O2*S2 O3*S3 O4*S4]. In some aspects, the mask sequence may include a transformation selected from a Hadamard transform basis, a Fourier transform basis, and/or the like.

FIG. 8C illustrates an example in which a first cell 802 is associated with a first codebook of spreading sequences and a second cell 804 is associated with a second codebook of spreading sequences, wherein the first codebook and the second codebook share at least one shared spreading sequence. As shown in FIG. 8C, and by reference number 814, the first cell 802 may be associated with a first set of spreading sequences (e.g., [S1 S2 S3 S4 S5 S6]). As shown by reference number 816, first UEs 120 associated with a cell center of the first cell 802 may be configured to use S1 through S4 of the first set of spreading sequences. In FIG. 8C, four first UEs 120 are shown. However, the techniques and apparatuses described in connection with FIGS. 8C-8E may be used for any number of first UEs 120, second UEs 120, and/or third UEs 120.

As shown by reference number 818, the second cell 804 may be associated with a second set of spreading sequences (e.g., [S1' S2' S3' S4' S5 S6]). Note that spreading sequences S5 and S6 are included in the first set of spreading sequences and the second set of spreading sequences. As shown by reference number 820, [S1' S2' S3' S4'] may be used for the third UEs 120 at the cell center of BS 110-2.

As shown by reference number 822, [S5 S6] may be used for the second UEs 120 at the cell edge of the first cell 802 and the second cell 804. The usage of S5 and S6, which are included in the first set of spreading sequences (e.g., the first codebook) and the second set of spreading sequences (e.g., the second codebook), may reduce cross-correlation, and therefore interference, between the first cell 802 and the second cell 804. For example, a codebook may be designed to reduce (e.g., minimize) interference between UEs of a cell using the codebook by causing the UEs of the cell to spread symbols according to the codebook. A UE that is at a cell edge between the first cell 802 and the second cell 804 can be detected by the first cell 802 (which uses the first codebook) and the second cell 804 (which uses the second codebook). Therefore, by using codewords that are common to the first codebook and the second codebook, the UE that is at the cell edge reduces interference that would be caused by reception of communications encoded according to a codebook unused by the receiving BS 110.

FIG. 8D is an example wherein a first set of spreading sequences (e.g., a first subset of a codebook) is used for cell-center UEs of the first cell 802 and the second cell 804, and wherein a second set of spreading sequences (e.g., a second subset of the codebook) is used for cell-edge UEs of the first cell 802 and the second cell 804 by perform cross-cell scheduling. As shown by reference number 824, a first set of spreading sequences (e.g., [S1 S2 S3 S4]) may be used for the first UEs 120 associated with the cell center of the first cell 802. For example, [S1 S2 S3 S4] may be from a codebook that includes [S1 S2 S3 S4 S5 S6]. As shown by reference number 826, the first set of spreading sequences may be used for the third UEs 120 at the cell center of the second cell 804. For example, since the first UEs 120 and the third UEs 120 are not at a cell edge between the first cell 802 and the second cell 804, inter-cell interference on account of the first/third UEs 120 may be unlikely. Therefore, reusing the first set of spreading sequences from a single codebook may conserve resources that would otherwise be used to determine, store, and use spreading sequences based at least in part on different codebooks.

As shown by reference number 828, a second set of spreading sequences (e.g., [S5 S6]) may be used for the second UEs 120 associated with the cell edge between the first cell 802 and the second cell 804. In this case, the BS 110-1 and the BS 110-2 may perform cross-cell scheduling for the second UEs 120. For example, the BSs 110-1 and 110-2 may coordinate scheduling so that the same spreading sequence is not assigned to two UEs 120 of the second UEs 120. For example, the second set of spreading sequences may be shared by the first cell 802 and the second cell 804 in cooperation. This may reduce intra-cell and inter-cell interference by using a smaller codebook or set of spreading sequences. For example, it may be easier to reduce (e.g., optimize, minimize) interference and/or cross correlation for a smaller codebook than for a larger codebook. By reusing [S1 S2 S3 S4] for the first UEs 120 and the third UEs 120, overall size of the codebook may be reduced.

In some aspects, the BSs 110-1 and 110-2 may perform the signaling required to coordinate scheduling of the second UEs 120 using a backhaul, using an over-the air interface, and/or the like. Furthermore, the management of resources for the UEs (e.g., the first UEs 120, second UEs 120, and/or third UEs 120) may be based at least in part on whether the UEs are cell-center UEs or cell-edge UEs. For example, a network controller 130 or BS 110 may perform more coordination for UEs at the cell edge, where interference is likely to occur, than for UEs at the cell center, thereby conserving processing and coordination resources that would otherwise be used to perform indiscriminate coordination. As another example, the network controller 130 or BS 110 may perform more coordination for resource blocks used by cell-edge UEs than for resource blocks that are not used by cell-edge UEs, thereby conserving processing and coordination resources that would otherwise be used to perform indiscriminate coordination. As used herein, performing coordination may refer to performing any of the operations described in connection with FIGS. 8A-8E.

FIG. 8E is an example wherein different sets of spreading sequences of a single codebook are used for the first UEs 120 (e.g., the cell-center UEs of the first cell 802), the second UEs 120 (e.g., the cell-edge UEs of the first cell 802 and/or the second cell 804), and the third UEs 120 (e.g., the cell-center UEs of the second cell 804).

As shown in FIG. 8E, and by reference number 830, a first set of spreading sequences (e.g., [S1 S2 S3 S4]) may be used for the first UEs 120 associated with the cell center of the first cell 802. For example, the first set of spreading sequences may be from a codebook that includes spreading sequences [S1 S2 . . . S10]. As shown by reference number 832, a second set of spreading sequences (e.g., [S5 S6]) may be used for the second UEs 120 associated with the cell edge between the first cell 802 and the second cell 804. For example, the BSs 110-1 and 110-2 may perform cross-cell scheduling for the second UEs 120 associated with the cell edge to avoid collisions with regard to S5 and S6, as described in more detail in connection with FIG. 8D, above.

As shown by reference number 834, a third set of spreading sequences (e.g., [S7 S8 S9 S10]) may be used for the third UEs 120 associated with the cell center of the second cell. The usage of different sets of spreading sequences of the single codebook for the first UEs 120 and the third UEs 120 may reduce the amount of coordination between cells to be performed, in comparison to using the same set of spreading sequences for all cell-center UEs, as described in FIG. 8D. This may conserve resources used to coordinate resource allocation for the second UEs 120.

In some aspects, the operations described in connection with FIGS. 8A-8E may be performed based at least in part on a time domain resource allocation. For example, a set of spreading sequences, or one or more spreading sequences of a set of spreading sequences, may vary over time. This may cause a cell that uses a first set of spreading sequences on first time resources (e.g., slots, time windows, etc.) to use a second set of spreading sequences on second time resources (e.g., slots, time windows, etc.). Additionally, or alternatively, resources used for NOMA communication may vary over time. For example, a UE may use a first set of resources for NOMA communication on first time resources, and may use a second set of resources for NOMA communication on second time resources. In this way, inter-cell interference may be further reduced. In some cases, this may be referred to as a hopping pattern.

As indicated above, FIGS. 8A-8E are provided as examples. Other examples may differ from what is described with respect to FIGS. 8A-8E.

FIG. 9 is a diagram illustrating an example process 900 performed, for example, by a network controller, in accordance with various aspects of the present disclosure. Example process 900 is an example where a network controller (e.g., network controller 130, BS 110, etc.) performs configuration of NOMA communication using multiple sets of spreading sequences to reduce inter-cell interference.

As shown in FIG. 9, in some aspects, process 900 may include determining a first set of spreading sequences and a second set of spreading sequences for non-orthogonal multiple access (NOMA) communication, wherein the first set of spreading sequences is different than the second set of spreading sequences (block 910). For example, the network controller (e.g., using controller/processor 280, controller/processor 290, and/or the like) may determine a first set of spreading sequences and a second set of spreading sequences. In some aspects, the network controller may receive or store information identifying the first set of spreading sequences and the second set of spreading sequences. The first set of spreading sequences may be different than the second set of spreading sequences. For example, the first set of spreading sequences may be associated with a different codebook than the second set of spreading sequences, may include different spreading sequences of a particular codebook than the second set of spreading sequences, and/or the like.

As shown in FIG. 9, in some aspects, process 900 may include configuring a first cell to use the first set of spreading sequences and a second cell to use the second set of spreading sequences (block 920). For example, the network controller (e.g., using controller/processor 280, controller/processor 290, and/or the like) may configure a first cell (e.g., a first BS, such as BS 110-1) to use the first set of spreading sequences, and may configure a second cell (e.g., a second BS, such as BS 110-2) to use the second set of spreading sequences. In some aspects, the network controller may configure UEs of the first cell (e.g., the first UEs 120 and/or the second UEs 120 of FIGS. 8C-8E) to use the first set of spreading sequences, and may configure UEs of the second cell (e.g., the second UEs 120 and/or the third UEs 120 of FIGS. 8C-8E) to use the second set of spreading sequences. While the cells described herein are often described as being provided by different BSs 110, in some aspects, a first cell and a second cell may be provided by a same BS 110.

As shown in FIG. 9, in some aspects, process 900 may include configuring the first set of spreading sequences to be used for first user equipment associated with a cell center of the first cell and the second set of spreading sequences to be used for second user equipment associated with a cell edge of the first cell or the second cell (block 930). For example, the network controller (e.g., using controller/processor 280, controller/processor 290, and/or the like) may configure the first set of spreading sequences to be used for first user equipment associated with a cell center of the first cell, and may configure the second set of spreading sequences to be used for second user equipment associated with a cell edge of the first cell and/or the second cell.

Process 900 may include additional aspects, such as any single aspect and/or any combination of aspects described below and/or in connection with one or more other processes described elsewhere herein.

In some aspects, the first set of spreading sequences and the second set of spreading sequences are truncated Chu sequences with different roots. In some aspects, a mask sequence is applied to the first set of spreading sequences to determine the second set of spreading sequences. In some aspects, the mask sequence is based at least in part on a Hadamard basis or a Fourier basis. In some aspects, the first set of spreading sequences and the second set of spreading sequences share at least one shared spreading sequence. In some aspects, the first cell is configured to use the first set of spreading sequences, the second cell is configured to use the second set of spreading sequences, and the at least one shared spreading sequence is used for communication with the second user equipment associated with the cell edge. In some aspects, the first set of spreading sequences is associated with a first codebook and the second set of spreading sequences is associated with a second codebook.

In some aspects, the cell edge of the first cell is adjacent to or overlapping the second cell. In some aspects, the first set of spreading sequences is used for third user equipment associated with a cell center of the second cell. In some aspects, a third set of spreading sequences, different from at least one of the first set of spreading sequences or the second set of spreading sequences, is used for third user equipment associated with a cell center of the second cell. In some aspects, the first set of spreading sequences, the second set of spreading sequences, and the third set of spreading sequences are associated with a single codebook. In some aspects, configuring the first cell, configuring the second cell, configuring the first set of spreading sequences to be used for the first user equipment, and configuring the second set of spreading sequences to be used for the second user equipment are performed using at least one of a backhaul interface or an over-the-air interface. In some aspects, the second set of spreading sequences is configured to be used for the second user equipment during a resource associated with NOMA communication of the second user equipment. In some aspects, the first set of spreading sequences and the second set of spreading sequences are selected from multiple, different sets of spreading sequences over time.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

A conjunction used with regard to two or more alternatives (e.g., "or" or "and/or") is intended to be interpreted as inclusive (e.g., "and/or") rather than exclusive of the two or more alternatives, irrespective of which form of the conjunction is predominately used herein, unless language to override this interpretation is used (e.g., "only one of," etc.).

What is claimed is:

1. A method of wireless communication performed by a network controller, comprising:
   determining a first set of spreading sequences and a second set of spreading sequences for non-orthogonal multiple access (NOMA) communication, wherein the first set of spreading sequences is different than the second set of spreading sequences; and
   configuring a first cell to use the first set of spreading sequences and a second cell to use the second set of spreading sequences; or
   configuring the first set of spreading sequences to be used for first user equipment associated with a cell center of the first cell and the second set of spreading sequences to be used for second user equipment associated with a cell edge of the first cell or the second cell, wherein the first set of spreading sequences and the second set of spreading sequences share at least one shared spreading sequence, and wherein the at least one shared spreading sequence is used for communication associated with the second user equipment associated with the cell edge.

2. The method of claim 1, wherein the first set of spreading sequences and the second set of spreading sequences are truncated Chu sequences with different roots.

3. The method of claim 1, wherein a mask sequence is applied to the first set of spreading sequences to determine the second set of spreading sequences.

4. The method of claim 3, wherein the mask sequence is based at least in part on a Hadamard basis or a Fourier basis.

5. The method of claim 1, wherein the first set of spreading sequences is associated with a first codebook and the second set of spreading sequences is associated with a second codebook.

6. The method of claim 1, wherein the cell edge of the first cell is adjacent to or overlapping the second cell.

7. The method of claim 1, wherein the first set of spreading sequences is used for third user equipment associated with a cell center of the second cell.

8. The method of claim 1, wherein a third set of spreading sequences, different from at least one of the first set of spreading sequences or the second set of spreading sequences, is used for third user equipment associated with a cell center of the second cell.

9. The method of claim 8, wherein the first set of spreading sequences, the second set of spreading sequences, and the third set of spreading sequences are associated with a single codebook.

10. The method of claim 1, wherein configuring the first cell, configuring the second cell, configuring the first set of spreading sequences to be used for the first user equipment, and configuring the second set of spreading sequences to be used for the second user equipment are performed using at least one of:
   a backhaul interface, or
   an over-the-air interface.

11. The method of claim 1, wherein the second set of spreading sequences is configured to be used for the second user equipment during a resource associated with a NOMA communication of the second user equipment.

12. The method of claim 1, wherein the first set of spreading sequences and the second set of spreading sequences are selected from multiple, different sets of spreading sequences over time.

13. A network controller for wireless communication, comprising:
   a memory; and
   one or more processors coupled to the memory, the memory and the one or more processors configured to:
      determine a first set of spreading sequences and a second set of spreading sequences for non-orthogonal multiple access (NOMA) communication, wherein the first set of spreading sequences is different than the second set of spreading sequences; and
      configure a first cell to use the first set of spreading sequences and a second cell to use the second set of spreading sequences; or
      configure the first set of spreading sequences to be used for first user equipment associated with a cell center of the first cell and the second set of spreading sequences to be used for second user equipment associated with a cell edge of the first cell or the second cell, wherein the first set of spreading sequences and the second set of spreading sequences share at least one shared spreading sequence, and wherein the at least one shared spreading sequence is used for communication associated with the second user equipment associated with the cell edge.

14. The network controller of claim 13, wherein the first set of spreading sequences and the second set of spreading sequences are truncated Chu sequences with different roots.

15. The network controller of claim 13, wherein a mask sequence is applied to the first set of spreading sequences to determine the second set of spreading sequences.

16. The network controller of claim 13, wherein the first set of spreading sequences is associated with a first codebook and the second set of spreading sequences is associated with a second codebook.

17. The network controller of claim 13, wherein configuring the first cell, configuring the second cell, configuring the first set of spreading sequences to be used for the first user equipment, and configuring the second set of spreading sequences to be used for the second user equipment are performed using at least one of:
   a backhaul interface, or
   an over-the-air interface.

18. The network controller of claim 13, wherein the second set of spreading sequences is configured to be used for the second user equipment during a resource associated with NOMA communication of the second user equipment.

19. The network controller of claim 13, wherein the first set of spreading sequences and the second set of spreading sequences are selected from multiple, different sets of spreading sequences over time.

20. A non-transitory computer-readable medium storing one or more instructions for wireless communication, the one or more instructions comprising:
   one or more instructions that, when executed by one or more processors of a user equipment, cause the one or more processors to:
      determine a first set of spreading sequences and a second set of spreading sequences for non-orthogonal multiple access (NOMA) communication, wherein the first set of spreading sequences is different than the second set of spreading sequences; and
      configure a first cell to use the first set of spreading sequences and a second cell to use the second set of spreading sequences; or
      configure the first set of spreading sequences to be used for first user equipment associated with a cell center of the first cell and the second set of spreading sequences to be used for second user equipment associated with a cell edge of the first cell or the second cell, wherein the first set of spreading sequences and the second set of spreading sequences share at least one shared spreading sequence, and wherein the at least one shared spreading sequence is used for communication associated with the second user equipment associated with the cell edge.

21. The non-transitory computer-readable medium of claim 20, wherein the first set of spreading sequences and the second set of spreading sequences are truncated Chu sequences with different roots.

22. The non-transitory computer-readable medium of claim 20, wherein a mask sequence is applied to the first set of spreading sequences to determine the second set of spreading sequences.

23. The non-transitory computer-readable medium of claim 22, wherein the mask sequence is based at least in part on a Hadamard basis or a Fourier basis.

24. The non-transitory computer-readable medium of claim 20, wherein the first set of spreading sequences is associated with a first codebook and the second set of spreading sequences is associated with a second codebook.

25. The non-transitory computer-readable medium of claim 20, wherein the cell edge of the first cell is adjacent to or overlapping the second cell.

26. The non-transitory computer-readable medium of claim 20, herein the first set of spreading sequences is used for third user equipment associated with a cell center of the second cell.

27. The non-transitory computer-readable medium of claim 20, wherein a third set of spreading sequences, different from at least one of the first set of spreading sequences or the second set of spreading sequences, is used for third user equipment associated with a cell center of the second cell.

28. The non-transitory computer-readable medium of claim 27, wherein the first set of spreading sequences, the second set of spreading sequences, and the third set of spreading sequences are associated with a single codebook.

29. The non-transitory computer-readable medium of claim 20, wherein the second set of spreading sequences is configured to be used for the second user equipment during a resource associated with a NOMA communication of the second user equipment.

30. The non-transitory computer-readable medium of claim 20, wherein the first set of spreading sequences and the second set of spreading sequences are selected from multiple, different sets of spreading sequences over time.

* * * * *